United States Patent [19]

Pauga

[11] 4,430,122

[45] Feb. 7, 1984

[54] FLUX-CORED ARC WELDING TUBULAR ELECTRODE

[75] Inventor: Uldis Pauga, Freeport, N.Y.

[73] Assignee: Eutectic Corporation, Flushing, N.Y.

[21] Appl. No.: 427,882

[22] Filed: Sep. 29, 1982

[51] Int. Cl.$^3$ ........................ C22C 38/54; B23K 35/36
[52] U.S. Cl. ............................... 75/123 B; 75/123 N; 219/146.1; 219/146.41; 219/145.22; 148/23; 148/24
[58] Field of Search ............ 75/123 B, 123 N, 123 K, 75/123 L; 219/145.22, 146.1, 146.23, 146.31, 146.32, 146.41, 74, 137 UN; 373/88; 148/24, 23

[56] References Cited

U.S. PATENT DOCUMENTS 4,122,238  10/1978  Frantzerb, Sr. ...................... 148/24

FOREIGN PATENT DOCUMENTS 5373442  6/1978  Japan ............................. 219/146.31
0420424  8/1974  U.S.S.R. ............................. 148/24

Primary Examiner—L. Dewayne Rutledge
Assistant Examiner—Debbie Yee
Attorney, Agent, or Firm—Hopgood, Calimafde, Kalil, Blaustein & Judlowe

[57] ABSTRACT

A flux-cored welding tubular electrode is provided made of a low-carbon steel strip having confined therein a uniform mixture of alloying ingredients and fluxing compounds in such proportion that substantially the total composition of the welding electrode including the low-carbon steel sheath consists essentially by weight of about 4.5 to 6% B, about 1.5 to 3.2% Mn, about 1.5 to 2.75% Ni, about 1.3 to 2.25% Si, about 0.375 to 1.2% C, about 2 to 6% of flux material compatible with the alloying ingredients, and the balance essentially iron. The composition of the electrode is proportioned such that the weld deposit produced from the electrode consists essentially by weight of about 0.4 to 0.8% C, about 4.8 to 6.2% B, about 1.6 to 3.0% Mn, about 1.6 to 2.8% Ni, about 1.4 to 2.4% Si, and the balance essentially iron.

9 Claims, No Drawings

4,430,122

FLUX-CORED ARC WELDING TUBULAR ELECTRODE

This invention relates to continuous tubular electrode made from low-carbon steel strip mechanically formed into a circular cross section and having confined herein a uniform mixture of fluxing compounds and alloying ingredients which together with the low-carbon steel sheath provides an iron-base alloy weld deposit having improved hardness and improved resistance to wear.

STATE OF THE ART

Flux-cored electrode wire is known made of low-carbon steel sheath having confined therein a core of fluxing and alloy material.

As stated in Volume 6 of the ASM Metals Handbook (8th Edition, 1971) entitled Welding and Brazing, pages 26 through 29, the manufacture of flux-cored electrode wire is a specialized and precise operation.

Low-carbon steel strip, e.g., such low-carbon steels as S.A.E. No. 1006, No. 1008, No. 1009, No. 1010, No. 1012, No. 1015, No. 1016, No. 1017 and No. 1018 through 1025, etc., is processed by passing the strip through contour-forming rolls which form the strip in a U-shaped cross section or trough which is then filled with a predetermined mixture of flux and alloying ingredients in powder form. The filled U-shaped strip then passes through closing rolls that mechanically form it into a tube in compression relationship with the core material. Optionally the filled tube may be reduced by passing it through drawing dies. The electrode may or may not be baked. A broad range of sizes may be produced ranging from such standard sizes as 0.045 inch in diameter to as high as 5/32 of an inch or higher, at 1/32 or 1/16 inch intervals between sizes.

The foregoing sizes enable the wire to be wound easily into a continuous coil or onto spools.

In the production of high hardness weld deposits or hardface coatings using flux-cored tubular electrodes, it is important that the weld deposit resist cracking following cooling from the molten state. Generally speaking, the harder the weld deposit, the greater is the tendency for the deposit to crack during cooling.

Hardfacing iron-base alloys are known containing carbon, boron, manganese and silicon. One alloy in particular (Boron Alloy AZ-3) is disclosed in an article by S. N. Levitskii, et al in the publication entitled Welding Production, 1977, Volume 24, No. 7, reference being made to page 29. This alloy contains 0.8% C, 1.8% Si, 2.0% Mn, 5.8% B and the balance iron. A disadvantage of many high-boron alloys of this type is the tendency for the weld deposit to crack.

It would be desirable to provide a high hardness, high wear resistant weld deposit that resists cracking during cooling from the molten state, especially high boron-containing iron-base alloys of the type referred to hereinabove.

A high-boron, iron-base weld deposit has now been developed having high hardness combined with improved resistance to wear and resistance to cracking.

OBJECTS OF THE INVENTION

It is an object of the invention to provide a weld deposit composition having improved hardness combined with improved resistance to wear.

Another object is to provide a flux-cored tubular electrode formed from a low-carbon steel strip or sheath having confined therein a mixture of fluxing compounds and alloying ingredients for producing a high boron-containing iron-base weld deposit characterized by high hardness, improved resistance to wear and resistance to cracking as the weld deposit produced therefrom is cooled in situ from the molten state.

These and other objects will more clearly appear when taken in conjunction with the following description and the appended claims.

STATEMENT OF INVENTION

One embodiment of the invention resides in a weld deposit composition consisting essentially of about 0.4 to 0.8% C, about 4.8 to 6.2% B, about 1.6 to 3.0% Mn, about 1.6 to 2.8% Ni, about 1.4 to 2.4% Si and the balance essentially iron. Preferably, the weld deposit composition may range from about 0.5 to 0.7% C, about 5 to 5.6% B, about 1.8 to 2.8% Mn, about 1.8 to 2.4% Ni, about 1.5 to 2.0% Si and the balance essentially iron.

A specific weld deposit is one containing approximately 0.6% C, 5.2% B, 2% Mn, 2% Ni, 1.8% Si and the balance essentially iron.

The invention further provides a continuous tubular electrode made of low-carbon steel strip of the type selected from S.A.E. steel compositions identified by S.A.E. Nos. 1006 to 1025, and the like, wherein the electrode is produced by roll forming the strip into a circular cross section having defined therein a filler metal core made up of powdered metal alloying additions mixed with fluxing compounds. The composition of the filler materials (fluxing and alloying ingredients) is controlled such as to provide a weld deposit or hardfacing composition which is air hardening.

The air-hardening deposits produced from the tubular welding electrode are characterized by extremely high hardness, exceptional abrasive and adhesive wear resistance at ambient temperatures, a low coefficient of friction and, moreover, are unique in their ductility or toughness as evidenced by their freedom from cross-cracking.

The welding wire operates efficiently and smoothly on both DC and AC power supplies and the very high deposit hardness and wear resistance are achieved over a wide range of deposition conditions, e.g., voltage, amperage, part mass, part temperature, substrate composition, and the like.

The high hardness and wear resistance of the deposit is believed due to the high volume fraction of uniformly distributed, extremely hard, prismatic borides dispersed throughout the C, Mn, Si and Ni solid solution strengthened iron matrix. The prismatic morphology and the crystallographic distribution of the boride particles are believed to contribute to the exceptional wear resistance of the deposit by preferentially exposing more surface area of the operating hard phase to the wear interface. The addition of nickel in the alloy is unique and essential in that it contributes to the hardness of both the (Fe, Ni)-borides and the matrix, and, most importantly, imparts ductility and toughness to the matrix and aids in preventing brittle stress cracking of the deposit during cooling, and thus consequently to chipping and spalling of the deposit in service.

In producing the weld wire from low-carbon steel strip (carbon ranging from about 0.05% to about 0.25%), the fluxing compounds compatible with the iron-base alloy of the invention may range from about 2 to about 6% of the total composition of the weld wire including the low-carbon sheath.

Since the flux does not enter into the alloy composition to any measurable degree, the total alloy composition, including the low-carbon steel which alloys with the alloying ingredients in the core will constitute about 94% to 98% of the total weight of the electrode wire. As will be obvious to one skilled in the art, this is taken into account in predetermining the weld deposit composition, assuming substantially complete recovery of all of the alloying constituents in the final weld deposit.

Thus, if the flux employed makes up about 4% of the total composition, the balance will constitute the alloying ingredients, including the low-carbon steel sheath, which alloy mixture will provide the desired weld composition. The term "weld deposit" employed herein is meant to cover any bonded deposit, such as a hardface coating.

As illustrative of various electrode compositions (percent by weight), the following ranges are given:

| | | Composition Of Electrode | | |
|---|---|---|---|---|
| | | Broad Range (%) | Narrow Range (%) | Optimum (%) |
| (A) | Fluxing Compounds | about 2-6 | about 3-5 | about 4 |
| (B) | Alloying Ingredients* | | | |
| | Boron[1] | about 4.5-6 | about 4.75-5.75 | about 5.5 |
| | Manganese[2] | about 1.5-3.2 | about 1.7-2.75 | about 2.1 |
| | Nickel | about 1.5-2.75 | about 1.7-2.3 | about 1.9 |
| | Silicon[3] | about 1.3-2.25 | about 1.45-1.9 | about 1.5 |
| | Carbon | about 0.375-1.2 | about 0.45-0.7 | about 0.575 |
| | Iron | balance | balance | balance |

*The amount of alloying ingredients listed takes into account the amount of slag-forming ingredients employed, losses due to oxidation and slag reactions, etc.
[1]Boron is generally added as a ferro-boron alloy containing about 20% boron.
[2]Manganese is added as a ferro-manganese alloy containing about 80% Mn.
[3]Silicon is added as SiC containing about 70% Si.

The amounts of alloying ingredients are indicated in the elemental form, although some are added in the form of ferro alloys as indicated in the table above.

The preferred fluxing compounds making up between about 2 to 6% of the total composition are listed below in terms of the total composition of the weld wire.

| Compound | Broad Range (%) | Narrow Range (%) | Optimum (%) |
|---|---|---|---|
| Fluorspar | about 0.2-1.4 | about 0.8-1.2 | about 1.1 |
| Rutile | about 0.4-1.0 | about 0.8-1.0 | about 0.8 |
| Aluminum | about 0.2-0.6 | about 0.3-0.5 | about 0.4 |
| Magnetite | about 1.5-2.5 | about 1.8-2.0 | about 1.9 |

Optionally, one or more of the following fluxes may be added: up to about 1% feldspar (e.g. 0.5-1%), up to about 1% cryolite (e.g. 0.4-1%) and up to about 0.6% Al$_2$O$_3$ (e.g. 0.2 to 6%). A preferred range is about 0.6-0.8% feldspar (e.g. about 0.8%), about 0.8 to 1% cryolite (e.g. about 0.8%) and about 0.3 to 0.5% Al$_2$O$_3$ (e.g. about 0.4%).

As is generally the case, some of the alloy ingredients may contain impurities in amounts that do not adversely affect the properties of the weld deposit. Such alloying ingredients may also contain residual amounts of silicon, manganese, carbon, iron, and the like, which may be considered in determining the overall composition of the alloy.

As illustrative of the invention, reference is made to the following examples with respect to the electrode composition:

| | Composition In Wt. % | | | |
|---|---|---|---|---|
| | Example 1 | Example 2 | Example 3 | Example 4 |
| Electrode Composition | | | | |
| Carbon | 1.1 | 1.0 | 0.9 | 1.1 |
| Boron | 5.6 | 5.3 | 5.3 | 5.3 |
| Manganese | 2.1 | 2.0 | 3.2 | 2.3 |
| Nickel | 2.0 | 1.9 | 1.9 | 1.9 |
| Silicon | 1.5 | 1.4 | 1.4 | 1.4 |
| Fluorspar | 1.2 | 0.4 | 1.1 | 1.1 |
| Rutile | 0.8 | 0.4 | 0.8 | 0.8 |
| Aluminum | 0.4 | 0.4 | 0.4 | 0.4 |
| Titanium | — | 1.1 | — | — |
| Magnetite | 2.0 | 1.9 | 1.9 | 1.9 |
| Feldspar | — | 0.8 | — | — |
| Iron | 83.3 | 83.4 | 83.1 | 83.8 |
| Weld Composition | | | | |
| Carbon | 0.63 | 0.67 | 0.70 | 0.66 |
| Boron | 5.2 | 5.2 | 5.3 | 5.1 |
| Manganese | 2.0 | 2.0 | 2.8 | 2.1 |
| Nickel | 2.0 | 2.0 | 2.2 | 2.1 |
| Silicon | 1.7 | 1.9 | 1.9 | 1.6 |
| Titanium | — | 0.3 | — | — |
| Iron | 88.47 | 87.93 | 87.10 | 88.44 |

Tests as to hardness and wear resulted in the following:

| | Example 1 | Example 2 | Example 3 | Example 4 |
|---|---|---|---|---|
| Rockwell "C" Hardness on As-Deposited Weld | 63 | 68 | 67 | 69 |
| Abrasive Wear Factor* | 110.9 | 54.4 | 73.7 | 63.6 |

*The wear factor is defined as the reciprocal of sample volume loss and is based on calculated sample density of 6.6 gm/cc.

The wear test employed is that described in U.S. Pat. No. 4,013,453 in column 9 which uses a fulcrum system comprising a pivotally mounted arm which supports a predetermined weight to provide a force at the opposite end of the fulcrum comprising an L-shaped member which bears against a rotating wheel with a sample to be tested mounted on the face of the L-shaped member. Hard particles of SiO$_2$ or SiC are fed from a hopper to between the sample and the wheel in contact therewith and the amount of wear being calculated in terms of volume of weld deposit removed. The wear factor is then determined as the reciprocal of the volume removed. The lower the volume removed, the higher will be the resistance to wear.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A weld deposit consisting essentially of about 0.4 to 0.8% C, about 4.8 to 6.2% B, about 1.6 to 3.0% Mn, about 1.6 to 2.8% Ni, about 1.4 to 2.4% Si and the balance essentially iron.

2. The weld deposit of claim 1, wherein the composition consists essentially of about 0.5 to 0.7% C, about 5.0 to 5.6% B, about 1.8 to 2.2% Mn, about 1.8 to 2.4% Ni, about 1.5 to 1.8% Si and the balance essentially iron.

3. The weld deposit of claim 2, wherein the composition consists essentially of the following approximate composition: 0.6% C, 5.2% B, 2% Mn, 2% Ni, 1.8% Si and the balance essentially iron.

4. A flux-cored welding tubular electrode made of a low-carbon steel strip having confined therein a uniform mixture of alloying ingredients and fluxing compounds in such proportion that substantially the total composition of the welding electrode including the low-carbon steel sheath, consists essentially by weight of about 4.5 to 6% B, about 1.5 to 3.2% Mn, about 1.5 to 2.75% Ni, about 1.3 to 2.25% Si, about 0.375 to 1.2% C, about 2 to 6% of flux material compatable with said alloying ingredients, and the balance essentially iron, the composition of the electrode being proportioned such that the weld deposit produced from the electrode consists essentially by weight of about 0.4 to 0.8% C, about 4.8 to 6.2% B, about 1.6 to 3.0% Mn, about 1.6 to 2.8% Ni, about 1.4 to 2.4% Si and the balance essentially iron.

5. The flux-cored welding tubular electrode as in claim 4, wherein the flux composition within the range of about 2 to 6% contains about 0.2 to 1.4% fluorspar, about 0.4 to 1% rutile, about 0.2 to 0.6% of aluminum and about 1.5 to 2.5% magnetite.

6. The flux-cored welding tubular electrode of claim 5, wherein the electrode includes optionally at least one additional flux selected from the group consisting of up to about 1% feldspar, up to about 1% cryolite and up to about 0.6% $Al_2O_3$.

7. A flux-cored welding tubular electrode made of a low-carbon steel strip having confined therein a uniform mixture of alloying ingredients and fluxing compounds in such proportion that substantially the total composition of the welding electrode including the low-carbon steel sheath, consists essentially by weight of about 4.75 to 5.75% B, about 1.7 to 2.75% Mn, about 1.7 to 2.3% Ni, about 1.45 to 1.9% Si, about 0.45 to 0.7% C, about 3 to 5% of flux material compatable with said alloying ingredients, and the balance essentially iron,, the composition of the electrode being proportioned such that the weld deposit produced from the electrode consists essentially by weight of about 5 to 5.6% B, about 1.8 to 2.8 Mn, about 1.8 to 2.4% Ni, about 1.5 to 2.0% Si and the balance essentially iron.

8. The flux-cored welding tubular electrode as in claim 7, wherein the flux composition within the range of about 3 to 5% contains about 0.8 to 1.2% fluorspar, about 0.8 to 1% rutile, about 0.3 to 0.5% aluminum and about 1.8 to 2% magnetite.

9. The flux-cored welding tubular of claim 8, wherein the electrode includes optionally at least one additional flux selected from the group consisting of about 0.5 to 1% feldspar, about 0.4 to 1% cryolite and about 0.2 to 0.6% $Al_2O_3$.

* * * * *